UNITED STATES PATENT OFFICE.

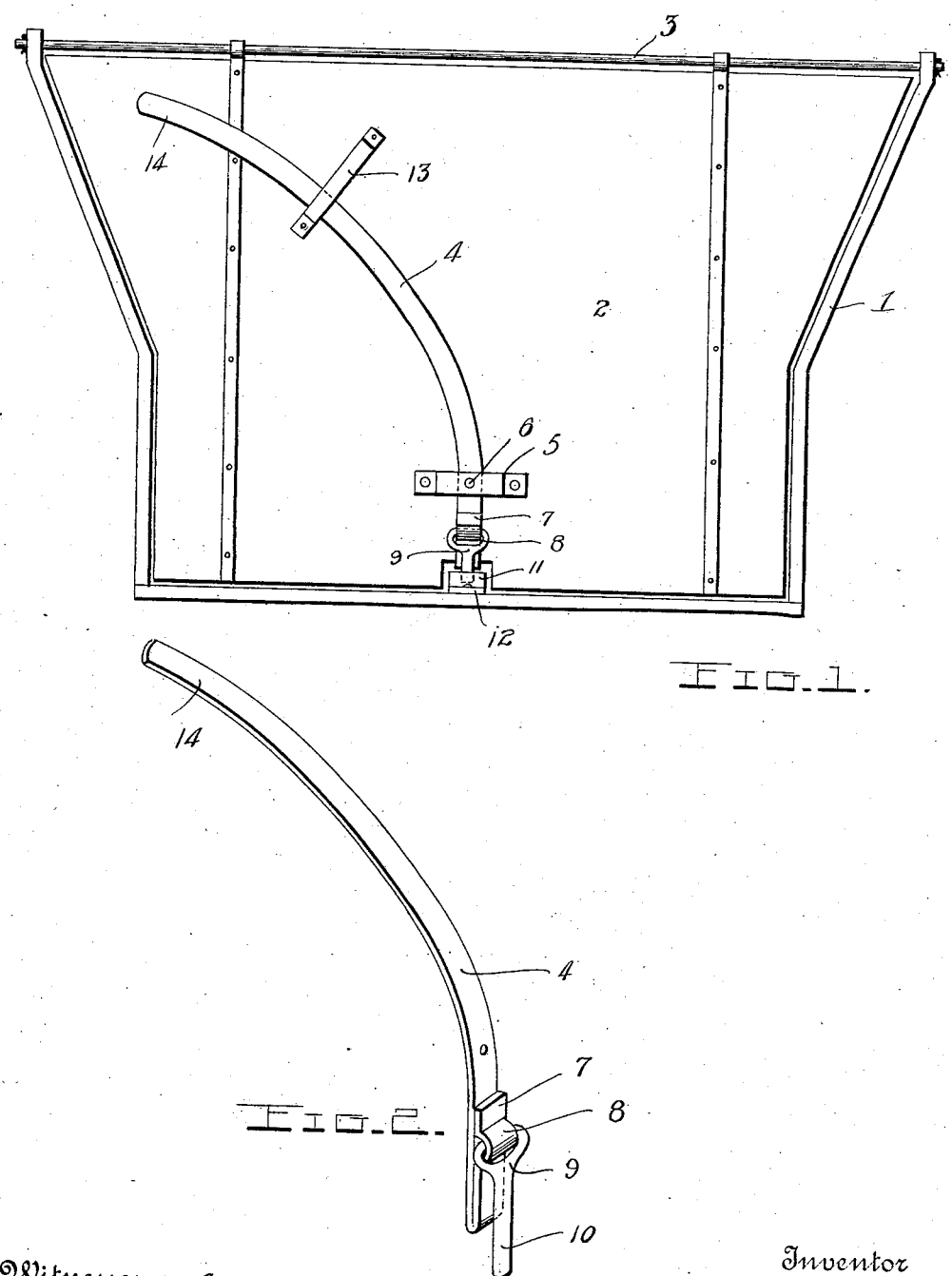

ALBERT T. CORRELL, OF BRADENVILLE, PENNSYLVANIA.

LOCKING MECHANISM FOR END-GATES.

No. 884,898.　　　　Specification of Letters Patent.　　　Patented April 14, 1908.

Application filed June 20, 1907. Serial No. 379,918.

*To all whom it may concern:*

Be it known that I, ALBERT T. CORRELL, a citizen of the United States, residing at Bradenville, in the county of Westmoreland and State of Pennsylvania, have invented certain new and useful Improvements in Locking Mechanism for End-Gates; and I do declare the following to be a full, clear, and exact description of the invention, such as will enable others skilled in the art to which it appertains to make and use the same.

This invention has relation to new and useful improvements in locking mechanism for end gates for wagons or other wheeled vehicles of any description where end gates are employed and has for its object to provide a simple and positively operating mechanism whereby an end gate may be securely locked in position and easily and readily opened.
With the foregoing and other objects in view which will appear as the nature of the invention is better understood, the invention consists in certain novel features of construction, combination and arrangement of parts as will be hereinafter fully described and claimed.

In the accompanying drawings, Figure 1 is an end view of the body of a vehicle with the end gate and locking mechanism therefor in position, the gate closed; and Fig. 2 is a detail perspective view of a portion of a lever and locking member employed in carrying out the invention.

Referring to the drawings for a more perfect understanding of the invention, 1 indicates the body of a car or other vehicle and 2 the end gate which is hinged thereto by a suitable cross-rod or bar 3. A curved lever 4 is pivotally connected near its lower end intermediately of the ends of a suitable plate or bar 5 secured to and longitudinally of the end gate by bolts 6 or other equivalent means, one of the bolts constituting a pivot for the lever. The lower or pivoted end of the lever projects or extends a suitable distance below said plate or bar 5 and is bent back on itself to provide an upwardly extending hinge member 7 having an intermediate outwardly bent portion 8 adapted to receive and support the upper end of a suitable locking member 9. A central downwardly extending shank or elongated portion 10 is adapted to engage the vertical portion 11 of an angular catch or plate 12 fas-
tened in any suitable manner to the vehicle body under the pivoted end of the lever.

To permit the end gate to swing inwardly or outwardly without engaging with the catch, a suitable recess is cut or formed in the bottom edge of the gate at a point immediately over the catch.

A suitable guide or keeper 13 is arranged near and over the free end of the lever to prevent lateral displacement thereof and to limit its movement. This guide may be of any form found most advantageous in the construction and application of the invention.

From the construction disclosed, it will be readily seen that the locking member has a hinged connection with the lower or pivoted end of the lever and that in swinging the end gate into a closed position, the lower end of the locking member will be allowed to pass the vertical portion of the catch 12, but as soon as the gate assumes its normal position will engage the inner face of the vertical portion of said plate and lock the gate in position. To open the gate the operator pushes upwardly on the free end of the lever, a handle 14 being provided at said end to facilitate its operation causing the locking member to move laterally and disengage the catch when the gate may be opened.

From the foregoing, it will be seen that the locking mechanism is of such construction that it may be readily applied or adapted to any form of end gate, that through its use all liability of the gate opening accidentally is obviated and that it may be readily and easily operated to enable the gate to be opened or raised. It is to be noted that by constructing the pivoted end of the lever in the manner shown and described, the locking member may be readily removed therefrom and a new one substituted should it become broken or unfit for use.

From the foregoing description, taken in connection with the accompanying drawings, the construction and operation of the invention will be readily understood without requiring a more extended explanation.

Having thus described my invention, what I claim as new is:—

1. The combination with a vehicle body having a hinged gate, of a lever pivoted near one end to the gate and arranged to be swung in a plane parallel therewith, a locking member hinged to the pivot end of the lever to swing in a plane at right-angles to the gate and a catch secured to the vehicle body under the pivot point of the lever, said catch having a vertical portion adapted to be engaged by the free end of the locking member.

2. The combination with a vehicle having a hinged end gate, of a lever pivoted to the gate, and arranged to be swung in a plane parallel therewith, the pivot end of the lever being bent back on itself to form a hinge member, a locking member having an eye to receive the hinge member of the lever, and a shank portion, and a catch attached to the vehicle body, said catch having a vertical portion adapted to be engaged by the shank portion of the locking member.

3. In combination with a vehicle having a hinged end gate with a recess in its bottom edge, of a catch fixed to the body of the vehicle under said recess, a lever pivoted to the gate at a point immediately above the recess thereof and arranged to swing in a plane parallel thereof, a locking member hinged to the pivot end of the lever, the free end of said member projecting below the inner wall of the recess and adapted to engage the catch.

4. The combination with a vehicle body having a hinged end gate, with a recess in its bottom edge, a catch fixed to the vehicle body, under the recess of the end gate, a lever pivoted to the gate and arranged to swing in a plane parallel therewith, the pivot end of the lever being bent back on itself to form a hinge member, a locking member having an eye to receive said hinge member and a shank portion projecting below inner wall of the recess, and adapted for engagement with the catch.

In testimony whereof I have hereunto set my hand in presence of two subscribing witnesses.

ALBERT T. CORRELL.

Witnesses:
J. W. SIMONSON,
PHILIP D. DEAN.